Feb. 6, 1945.   V. EINARSSON   2,368,811
APPARATUS FOR DRYING HAY, VEGETABLES, FISH, AND THE LIKE
Filed June 11, 1941
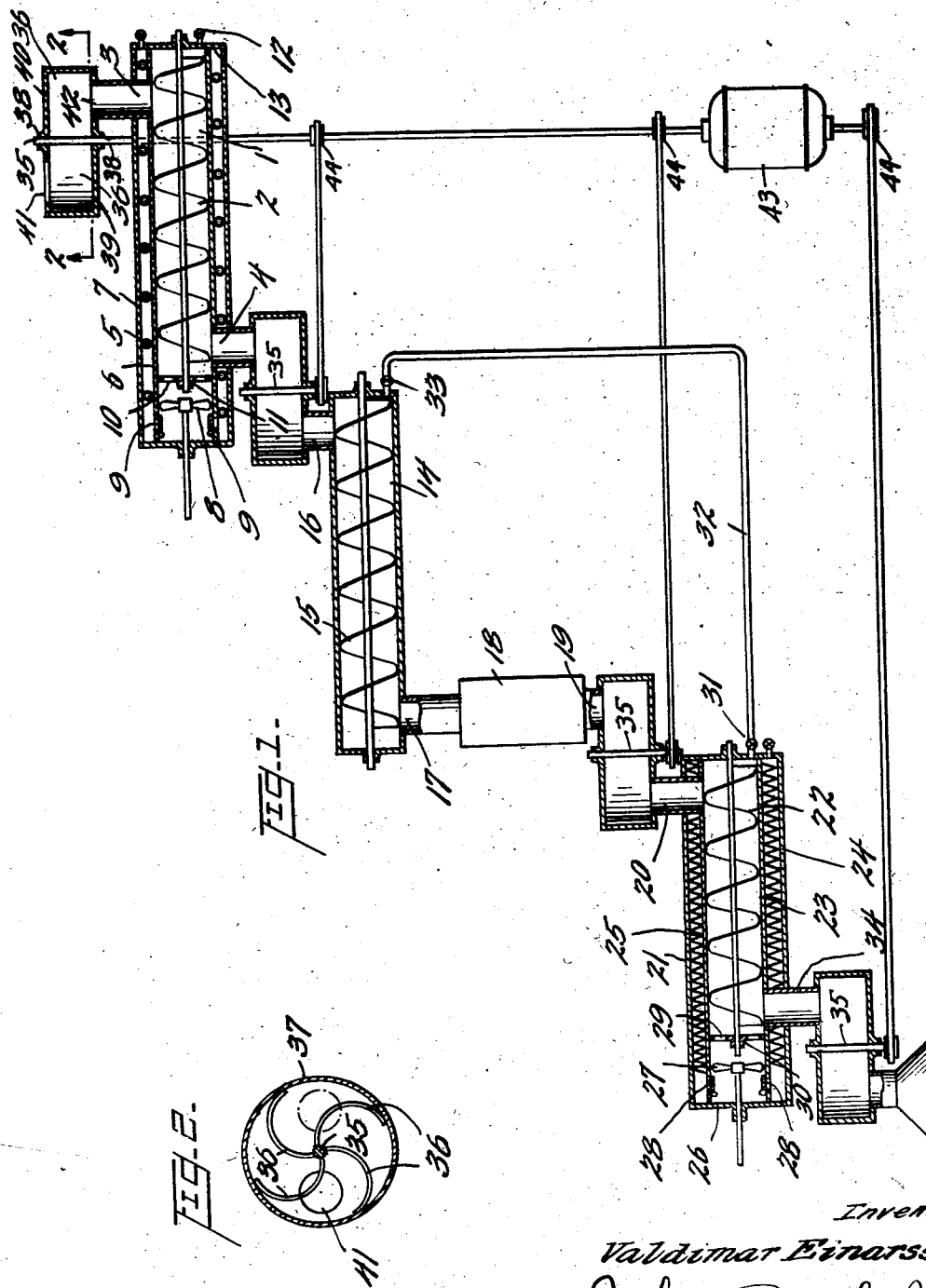
Inventor
Valdimar Einarsson
By John Boyle Jr.
Atty Patented Feb. 6, 1945

2,368,811

UNITED STATES PATENT OFFICE 2,368,811

APPARATUS FOR DRYING HAY, VEGETABLES, FISH, AND THE LIKE

Valdimar Einarsson, Reykjavik, Iceland

Application June 11, 1941, Serial No. 397,640

3 Claims. (Cl. 34—58)

My invention relates to the drying of materials of the type in which water is incarcerated in organic cells, and where the resistance of the cell walls, against allowing the water to escape, has to be overcome. The materials that are dried are such as hay, vegetables, fish and the like. By way of example, the operation will be more particularly described in connection with the drying of hay.

In the drying of hay and other like materials where the water is incarcerated within the walls of cells, it has been shown that the paramount difficulty to contend with has been that of overcoming the resistance of the cell walls against allowing the water to escape. It is a well known fact that newly mown grass is living, until some 40% of its water content has left it by evaporation. As long as the hay still retains this 40% of water, the hay retains the characteristics of living grass.

When newly mown grass is dried at a low temperature, its surface contracts and prevents the evaporation of the water. This makes the drying of hay expensive, since as a direct consequence of this, increased energy and extended time are required, both of which factors have to be eliminated, if drying by machinery is to be a paying proposition.

In order to overcome the resistance of the walls of cells against allowing the water to escape, principally two means have been adopted:

1. The degree and quantity of heat has been greatly increased beyond what is normal in drying. Thus, the temperature has been raised to 150–700° centigrade. When the temperature has exceeded 150° C. the water is very quickly converted into steam, the expansion of which bursts the cell walls, and the water in the hay speedily evaporates. With an apparatus constructed for a high degree of temperature, hay may thus be dried in an exceedingly brief time. By this method, scientists maintain, too much vitamin C is lost, as it will not stand temperatures above 120° centigrade.

2. When drying is to be done at a low temperature, the method used for inducing the cell walls to allow the water to escape is to use a strong current of air. This has given good results, though it is rather costly, the prime cost of the machinery being in particular great.

My method for the drying of hay, vegetables, fish and the like, is as follows:

In order to overcome the resistance of the cell walls, the hay, or whatever is to be dried, is first put through a refrigerator. In the freezing compartment, the temperature is 10°–15° C. below zero. The water contained in the cells in newly mown grass freezes fairly quickly in so low a temperature that large ice crystals are formed in the cells. The freezing compartment of the apparatus is of small dimensions, and not much energy is required for bringing the temperature down to —15° C. in a small compartment. The ice crystals require more space than the water that was incarcerated in the cell and so burst the cell walls. Access to the water in the cell is now easy, where it lies in the form of ice crystals inside and outside the torn cell. The hay, or whatever is to be frozen, is kept in motion in the little freezing compartment by suitable agitating means, such as a spiral screw. When the hay leaves the freezing compartment it enters another tube, fitted with a spiral screw securely insulated from the refrigerator. In that tube the temperature is about 10°–20° C. In a temperature of 10°–20° C., the ice crystals in the hay melt, but as all the cells have been pierced by the ice crystals the water is for the most part lying unfettered on the surface of the hay. The wet hay now continues its course along this spiral screw tube straight down into a centrifugal machine which in a very brief space of time whirls the water out of the hay. Not all of the water, however, has left the hay, from which 75%–80% of its content of water has to be removed before it can be regarded as fully dried. But the remainder of the drying process is easily accomplished and may be done at a low degree of temperature, about 40° C., access to the water that is left being easy, since the cell walls no longer prevent evaporation. When the hay leaves the centrifugal machine it enters still another spiral screw channel.

After coming almost dry out of the centrifuge into the third spiral screw channel, the hay there encounters a warm air current which penetrates it, coming directly against it through the channel all the time it is there, and when the hay leaves it, it is dry.

Referring to the drawing for a more complete disclosure of the invention:

Figure 1 is a diagrammatic view of an apparatus suitable for carrying out the method;

Figure 2 is a section on the line 2—2 of Fig. 1.

For carrying out the method, I may use an apparatus such as is shown in the drawing, in which 1 is a freezing compartment in which there is a rotary spiral screw 2 for moving the material through the compartment from the entrance 3 to the exit 4. Refrigerating coils 5 are located between the inner wall 6 and the outer wall 7 for reducing the temperature of the freezing compartment. If it should be desired to circulate the air in the freezing compartment and renew the air, then a rotary fan 8 can draw air through the valves 9 and force it through the apertures 10 in the end wall 11. A valve 12 may also be mounted in the end wall 13.

Connected to and insulated from the exit 4 of the refrigerator by the entrance 16 is a heating compartment 14 that is provided with a rotary spiral screw 15 for conveying the material through the heating compartment to the exit 17 which is connected to a centrifugal machine 18 which has an exit 19 connected to the entrance 20 of an electric heater 21. In the chamber of the heater is mounted a rotary spiral screw 22. The chamber has an inner metal wall 23 and an outer metal wall 24, heat insulated on the exterior, and mounted between the walls is the electric resistance heating element 25. Mounted in the end wall 26 is the rotary fan 27 which draws air slowly into the intra-mural space where it is heated and the hot air is drawn through valves 28 and pumped into the spiral screw channel through the apertures 29 in the partition 30, against the moving material, and it dries on its way through the channel. The air as it leaves the heater 21 through the valve 31 is at a temperature of approximately 15° C. and is conducted through the pipe 32 and valve 33 for melting the ice crystals in the compartment 14 which were formed in the refrigerator 1. The water formed in the heating chamber 14 by the melting of the ice crystals and the moisture in the hot air is largely removed by the centrifuge 18. The dried material is discharged through the exit 34.

The following alternative method of drying may be effected and while the duration of the drying process is lengthened, the first cost of the apparatus is greatly reduced. When drying is to be done by this method, only the freezing compartment would be used. In order to remove the ice crystals and thus to dry, the fan 8 in the freezing compartment puts the air in the compartment in motion and also renews it as required. When the air in the freezing compartment is put in motion and rubs against the ice crystals and the surface of the material to be dried, and also when the air in the freezing compartment is slowly renewed, the ice crystals melt and the water is taken up by the air. When hay or vegetables dried in this manner have become dry, the surface of the same has somewhat contracted. In order that air may less readily affect the hay for a long time stored in sheds or tall ricks, it is necessary to reduce its size in a chaff cutter before or after drying, then storing it in a high barn or a tall rick. The hay then becomes compressed and is very little harmed by the action of the air, even if stored for a long time.

Another alternative method is drying by the use of the centrifugal machine alone, the raw material being put into it and made to revolve at such a high rate of velocity as to burst the walls of the cells and removing the freed water by centrifugal force. In this case, it would only be necessary to complete the drying in the electric heater.

As an alternative construction, the spiral screws could be hollow and perforated and the air blown through the hollow screws in contact with the material being treated.

For feeding the material to be treated in and out of the various chambers and to prevent the escape of hot or cold air, I may use a special type of door or valve.

On a vertical axis 35, which revolves in two bearings 38, one at each end of the axis, are fixed four crescent-formed wings 36. Each of these wings forms an angle of 90 degrees with the axis. These metal wings move with the axis in a round tube of metal 37 fitted with a bottom 39 and a lid 40. The crescent formed metal wings are of the same width as the length of the axis in the tube. Each two metal wings form an angle of 180 degrees against each other. In this manner are formed four compartments as shown in Fig. 2. In order that these valves may be used for feeding, discharging, or as a connecting link between spiral screw channels, a piece 41 commensurate with the space between two of the metal wings extending from the axis is cut out of the ceiling over the tube. This forms an aperture which may be either on the top or at the front of the metal tube, according as the feeding is to be done from above or from the side. A similar piece 42 is also cut out of the floor of the tube, on the side facing the spiral screw channel or the centrifuge to be fed.

When the material to be dried has been put into one of the compartments, from above or from the side, and the wings on the axis which are in constant motion have revolved 180°, the compartment which was fed from the outside is over the aperture which was cut in the floor and its contents are dropped into the spiral screw channel or the centrifuge. The spiral screw can feed through such a valve if the latter is formed as a prolongation of the spiral screw channel, seeing that the spiral screw pushes the hay into the space between the wings which then carry the hay along until it falls through the floor as already described. The four metal wings are longer than the shortest space between the axis and the walls enclosing it. Accordingly the wings are made crescent-formed, and all bent in the same direction against their own motion in the tube. If they are made of a metal of great elasticity they fall closely to the walls and prevent hot or cold air from escaping largely. These wings are of course as well insulated as possible, and also the tube enclosing them. At the upper and lower end of the wings, at the floor and the ceiling of the tube, each wing will be fitted with packing which sweeps the floor and the ceiling of the tube as the wings revolve.

Suitable means are provided for rotating the axis 35 of each of the four valves in the four compartments 37 to insure of the material being fed through the chambers in the described order and said means may be said to consist of the prime mover in the form of the electric motor 43 for rotating the axis 35 of the uppermost compartment while pulley and belt arrangements generally designated 44 serve to transmit rotary motion from the said axis 35 to the axis 35 in the remaining compartments as indicated in Fig. 2.

What is claimed is:

1. In an apparatus for drying material, a closed system comprising a freezing chamber provided with a sealed inlet, means for cooling the freezing chamber, a heating chamber, a conduit connecting the exit end of the freezing chamber to the inlet end of the heating chamber, a valve in the conduit, a centrifugal separator, a conduit connecting the exit end of the heating chamber with the inlet end of the separator, a second heating chamber, a conduit connected to the outlet end of the separator and the inlet end of the second heating chamber, a valve in the last named conduit, a sealed outlet for the second heating chamber, means for heating the heating chambers and means for conveying the material through the said chambers in the order herein recited.

2. In an apparatus for drying material, a closed system comprising a freezing chamber, means for cooling the freezing chamber, a heating chamber, a conduit connecting the exit end of the freezing chamber to the inlet end of the heating chamber, a valve in the conduit, means for heating the heating chamber, and means in the chambers for conveying the material therethrough in the order recited herein.

3. In an apparatus for drying material, a closed system comprising a freezing chamber provided with a sealed inlet, means for cooling the freezing chamber, a heating chamber, a conduit connecting the exit end of the freezing chamber to the inlet end of the heating chamber, a valve in the conduit, a second heating chamber, a conduit connecting the inlet of the second heating chamber with the outlet of the first named heating chamber, a valve in the last named conduit, means for heating the said second heating chamber, and a pipe connection from the interior of the second heating chamber to the interior of the first heating chamber for conveying heat to the first heating chamber, and means for feeding material through the said chambers in the order recited herein.

VALDIMAR EINARSSON.